Sept. 15, 1936. J. C. WRIGHT ET AL 2,054,278
FISHING TOOL
Filed Aug. 21, 1934 2 Sheets-Sheet 1
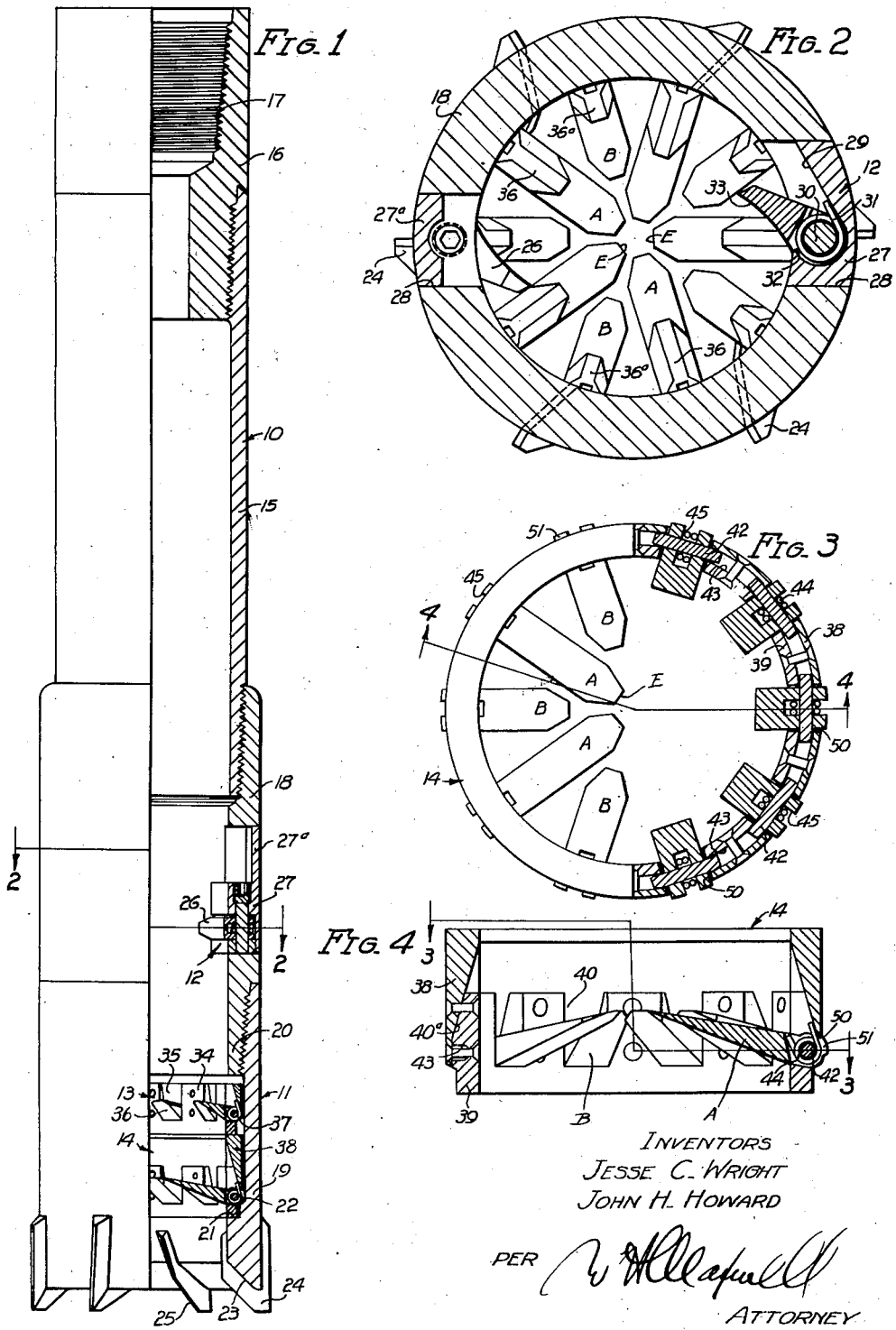
INVENTORS
JESSE C. WRIGHT
JOHN H. HOWARD
ATTORNEY

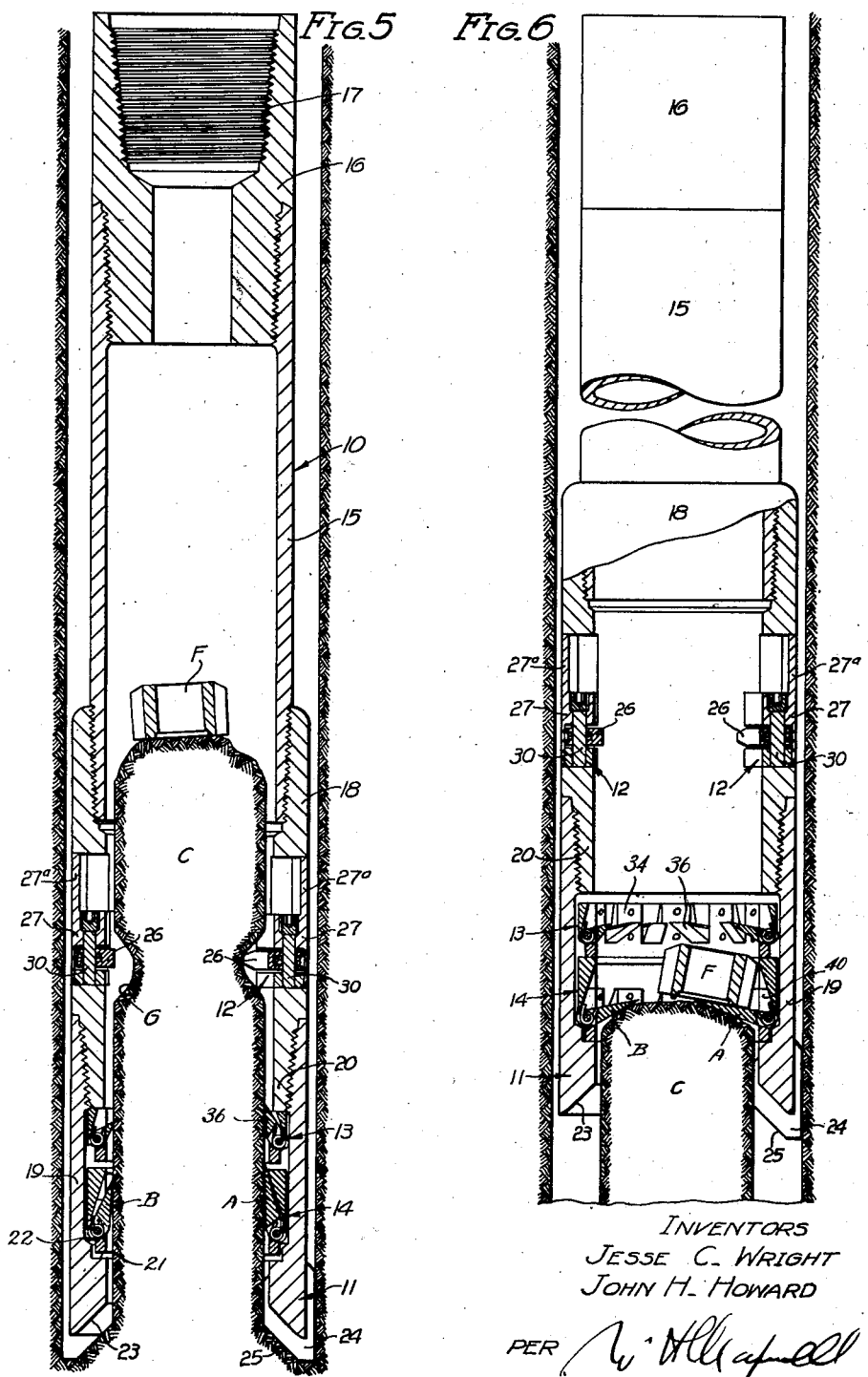

Patented Sept. 15, 1936

2,054,278

UNITED STATES PATENT OFFICE 2,054,278

FISHING TOOL

Jesse C. Wright, Los Angeles, and John H. Howard, Huntington Park, Calif.

Application August 21, 1934, Serial No. 740,796

12 Claims. (Cl. 255—72)

This invention relates to a well tool and relates more particularly to a fishing tool for recovering lost objects from wells. A general object of the invention is to provide a practical, dependable fishing tool that is operatable to recover fish or lost objects of various characters and sizes under various well conditions.

Another object of the invention is to provide a fishing tool that embodies a cutting head operatable to make an annular cut in the earth formation and thus provide a core which carries the fish into the tool whereby the fish, or the core and the fish supported thereon, may be retained in the tool and recovered from the well.

Another object of the invention is to provide a fishing tool of the character mentioned that is fully operative and consistently successful in recovering lost objects of various sizes where earth formations of various characters are encountered. The tool of the present invention is operative and capable of recovering fish where soft, moderately hard and hard earth formations are encountered.

Another object of the invention is to provide a fishing tool of the character mentioned that embodies two holding units or catchers, one catcher being operatable to effectively grip and break loose cores of moderately soft and moderately hard earth formations and thus recover the fish supported on the core, the other catcher being operatable to retain and hold fish of various sizes when the core is of hard earth formation.

Another object of the invention is to provide a fishing tool embodying a cutting head provided with cutting parts shaped and arranged to guide and urge the lost object or objects into the barrel or body so that they are out of the path of the cutting head and are supported on the upper end of the core.

Another object of the invention is to provide a fishing tool of the character mentioned that includes a novel means for cutting an annular groove in the core to insure the effective operation of the core catcher.

A further object of the invention is to provide a fishing tool of the character mentioned that is simple of operation and construction comprising a single tubular structure or barrel carrying the cutting head, the core catcher, the fish catcher and the core cutting means.

The various objects and features of the invention will be fully understood from the following detailed description of a typical preferred form and application of the invention, throughout which description reference is had to the accompanying drawings, in which:

Fig. 1 is a side elevation of a tool embodying the present invention with one quarter in longitudinal cross section. Fig. 2 is an enlarged transverse detailed sectional view taken substantially as indicated by line 2—2 on Fig. 1. Fig. 3 is a plan elevation of the fish catcher with one half in horizontal cross section, being a view taken as indicated by line 3—3 on Fig. 4. Fig. 4 is a vertical detailed sectional view taken substantially as indicated by line 4—4 on Fig. 3. Fig. 5 is a central longitudinal detailed sectional view of the tool in operation in a well where moderately soft or moderately hard earth formations are present. Fig. 6 is a central longitudinal detailed sectional view of the principal parts of the tool showing the fish catcher lifting a lost object from the upper end of a core of hard earth formation.

The fishing tool of this invention includes, generally, a barrel or tubular body 10, a cutting head 11 on the lower end of the body operatable to make an annular cut in the earth formation, means 12 on the body 10 for making a cut in the core C, a core catcher 13 for recovering cores of soft and moderately hard formations and thus recover the fish, and a catcher 14 operatable to catch and retain the fish or lost object when the core is of hard earth formations.

The barrel of body 10 is adapted to be connected with the lower end of an operating string of drill pipe or the like. The principal tubular section 15 of the body 10 is provided at its upper end with a connecting member or sub 16. A box or socket 17 is provided in the sub 16 to receive a pin of a part of the operating string. A sub 18 is attached to the lower end of the section 15 and carries the cutting head 11. The sub 18 carries the means 12 while the cutting head 11 supports the two catchers 13 and 14, it being apparent that the body or shoe 19 of the head 11 forms a rigid continuation of the body 10.

The body or shoe 19 of the cutting head 11 is tubular and is threaded on the downwardly projecting pin 20 of the sub 18. The lower portion of the shoe 19 is internally thickened and the shoe has two upwardly facing internal shoulders 21 and 22. The lower end 23 of the shoe 19 is inclined upwardly and inwardly to guide the fish or lost objects into the body 10. Cutting parts 24 are provided on the shoe 19 to make an annular cut in the earth formation when the tool is rotated and fed downwardly in the well-known manner. In the preferred form of the invention the cutting parts 24 are in the nature of circumferentially spaced blades projecting downwardly from the lower end of the shoe 19. The cutting parts or blades 24 may be held in slots in the shoe to project from the inner and outer surfaces of the shoe to make an annular cut of sufficient size to pass the shoe with suitable clearance. The inner lower corners of the cutting blades 24 are bevelled off so that the blades have upwardly and inwardly inclined inner edges 25. In accordance with the invention the cutting blades 24 are set or arranged to aid in guiding the lost objects into the body 10. The cutting blades 24 are inclined upwardly and rearwardly relative to the forward or right hand direction of rotation of the tool. The cutting blades 24 shaped and positioned as just described operate to move the fish inwardly and upwardly out of their path of movement so that the fish does not interfere with their proper operation. The fish in being moved inwardly to the center of the well bore is supported on the upper end of the core C formed by the cutting blades 24. In this manner the fish is automatically carried into the tubular body 10.

The means 12 is operatable to make an annular cut or groove in the core C to insure the effective gripping action of the core catcher 13 and to weaken the core so that it may be readily broken free when the tool is raised. The means 12 includes one or more cutters 26. In the preferred construction illustrated in the drawings there are two diametrically opposite cutters 26 mounted on the interior of the sub 18. Blocks 27 are arranged in openings 28 in the wall of the sub 18 to carry the cutters 26. The blocks 27 may be welded or otherwise suitably fixed in the openings 28. Circumferentially extending recesses 29 are provided in the inner sides of the blocks 27 and extend forwardly from the rear sides of the blocks. The cutters 26 are arranged in the recesses 29 and pins 30 extend downwardly through longitudinal openings in the blocks to pivotally support the cutters. The blocks 27 may be provided with reduced or recessed upwardly extending portions 27a to permit the easy insertion and withdrawal of the cutter carrying pins 30. The recesses 29 are adapted to fully receive the cutters 26 when the tool is rotated in the forward direction. The cutters 26 are pivotally mounted in the forward ends of the recesses 29 and are adapted to project into the tubular sub 18 to engage the core C. The outer or projecting ends of the cutters 26 are suitably sharpened to cut into the core C when the tool is turned in a reverse or backward direction.

Means is provided for urging the cutters 26 outwardly to engage the core. Torsional springs 31 surround the pins 30 and react against the cutters 26 to yieldingly urge them against the core C. The cutters 26 project inwardly and rearwardly from the pins 30 when in the fully operative positions and may be provided with stop shoulders 32 to limit their inward pivoting. The inward and forwardly facing sides 33 of the cutters 26 are concave to substantially conform to the inner wall of the sub 18 when the cutters are in their retracted or inoperative positions. When the tool is rotated in the reverse direction after the forming of the core C the springs 31 urge the cutters 26 against the core so that the cutting edges of the cutters bite into and cut away the core to make an annular groove G. It is to be understood that during the right hand or forward rotation of the tool during the forming of the core C the cutters 26 are held in their inactive positions through their engagement with the core and do not in any way interfere with the proper operation of the tool.

The core catcher 13 is provided to grip and retain moderately soft and moderately hard cores so that the fish or lost objects on the upper end of the core are recovered. In the particular arrangement of parts illustrated in the drawings the core catcher 13 is positioned within the shoe 19 of the cutting head and is supported on the catcher 14, it being understood that the core catcher 13 may be supported in other manners if desired. The core catcher 13 includes an annular body 34 made up of two rings seated one within the other and riveted or otherwise connected together. The body 34 of the core catcher is rotatable in the shoe 19 at the lower end of the pin 20. The opening in the annular body 34 is adapted to receive and pass the core C with suitable clearance. Recesses 35 are provided in the interior of the core catcher body 34 to carry pivoted gripping dogs 36. The dogs 36 are urged downwardly and inwardly by springs 37 to engage or cooperate with the core C. The upper and lower ends of the recesses 35 support the dogs 36 against further downward movement when the dogs are in their fully actuated core supporting positions. The dogs 36 are preferably of different lengths. In the particular arrangement of parts illustrated in detail in Fig. 2 of the drawings every other dog 36a is comparatively short. The remaining dogs 36 are somewhat longer to project greater distances into the cutting head.

During the passage of the core C into the tool the dogs 36 and 36a are retracted or held upwardly and outwardly in the recesses 35. The body 34 in being rotatable in the shoe 19 may be held against rotation relative to the core and fish so that the core catcher is not excessively worn or injured. After the formation of the groove G in the core C the tool may be raised so that the pointed dogs 36 and 36a pivot into the groove G and bite into the core C to cause the core to be broken loose from the earth formation. The dogs 36 and 36a thereafter support the core in the body 10 as the tool is withdrawn from the well. The core gripping or engaging dogs 36 and 36a in being comparatively short are operatable to obtain firm effective supporting and gripping cooperating with cores of relatively hard earth formations. The short dogs 36a are adapted to have particularly effective engagement with harder cores while the longer dogs 36 are adapted to grip and support slightly undersized cores and cores of softer earth formations.

The catcher 14 is provided to directly engage and carry the fish or lost objects when the core C is of hard earth formations. Further, the catcher 14 is adapted to recover the larger fish. The catcher 14 includes an annular body rotatably supported in the shoe 19 of the cutting head. This body of the catcher 14 may comprise two rings 38 and 39 arranged one within the other and having upwardly and inwardly inclined contacting surfaces 40a. The lower end of the inner ring 39 is adapted to seat on the shoulder 21 to support the catcher 14 in the shoe 19. The core catcher 13 rests on the upper end of the outer ring 38. The inner ring 39 is provided with circumferentially spaced recesses 40 which are closed at their outer sides by the surfaces 40a of the ring 38. Dogs A and B are provided in alternate recesses 40 and are adapted to project inwardly to engage and support the fish or lost objects. Pins 42 pass horizontally through the lower portions of the recesses 40 to pivotally support the dogs A and B. An annular groove 43 is provided in the periphery of the ring 39 and the outer side of this groove is closed by the ring 38. The opposite end portions of the dog supporting pins 42 are carried in the recess 43. The pins 42 have flat or bevelled surfaces which cooperate with the walls of the groove 43 to hold the pins against rotation.

Springs 44 are arranged in notches 45 in the dogs A and B to yieldingly urge the dogs downwardly and inwardly. The upper and lower sides of the dogs A and B converge to comparatively sharp edges E at the lower ends of the dogs. In accordance with the invention the dogs A are comparatively long and when in the fully actuated positions the outer ends E of the dogs A are immediately adjacent the central longitudinal axis of the tool. The dogs B are considerably shorter than the dogs A so that their outer ends are spaced some distance inwardly from the central longitudinal axis of the tool. The dogs A and B are comparatively wide and because of their relative lengths and locations are operable to catch and retain anything but the very smallest of fish. The lower ends of the walls of the recesses 40 are adapted to limit the downwardly and inwardly pivoting of the fish retaining dogs A and B.

Cam means may be provided to positively actuate the fish recovering dogs A and B. The bodies of the catchers 13 and 14 may have limited longitudinal movement in the shoe 19. The dogs A and B extend outwardly through openings 50 in the periphery of the catcher body and the projecting ends of the dogs have cam parts 51. The cam parts 51 are adapted to cooperate with the shoulder 22 to urge the dogs A and B to their operative positions. The cam parts 51 may engage the upper walls of the openings 50 to aid in supporting the dogs in their operative positions. The shoulder 22 is preferably inclined downwardly and inwardly. After a core C of hard formation has been formed the tool may be raised and the dogs 36, 36ª and the dogs A and B ride up on the hard core without materially retarding the upward movement. Upon the dogs A and B approaching the upper end of the hard core they pivot inwardly and downwardly following the contour of the core and thus engage under a fish that may be resting on the upper end of the core. In the event that the fish is of considerable weight the weight acting on the dogs A and B tends to move the core catcher 14 downwardly and the cam parts 51 engage or bear on the shoulder 22 to forcibly pivot the dogs A and B inwardly and downwardly to their effective fish supporting positions.

In operation the fishing tool is run into the well on the lower end of the operating string and upon reaching the bottom of the well the tool is rotated and fed downwardly so that the cutting blades 24 make an annular cut in the earth formation and provide a core C. The cutting blades 24 are shaped and pitched to direct or guide the lost object or objects upwardly and toward the center of the well bore so that they are received within the shoe 19. As the drilling or coring operation progresses the fish or lost object or objects remain supported on the upper end of the core and are thus fed into the downwardly moving tool. In Fig. 5 of the drawings we have illustrated a fish F in the form of a roller cutter resting on the upper end of the core C within the body section 15. When the fish F is comparatively small or when the core C is not extremely hard it may be preferred to cut or break off the core in the tool and thus retain the fish within the tool whereby it may be readily recovered. To assist the operation of the core catcher 13 and to weaken the core C whereby it may be readily broken free the tool may be rotated in a reverse or left hand direction so that the cutters 26 of the means 12 operate to cut the groove G in the core. After the groove G has been cut to a suitable depth the rotation may be suspended and the tool may be raised to bring the dogs 36 and 36ª to positions opposite the groove G. The springs 37 pivot the dogs 36 and 36ª downwardly and inwardly into the groove G and further upward movement of the tool causes the dogs to effectively bite into the core C. The upward strain on the tool causes the core C to be broken loose from the formation so that the dogs 36 and 36ª retain the core C in the body 10. The fish F, of course, remains on the upper end of the core within the body and may be brought to the surface in the tool. The above described manner of operation is particularly effective where the lost object or objects are comparatively small and where the earth formation being penetrated is moderately soft or moderately hard.

To recover a large fish or lost object and to recover a fish where the formation being penetrated is very hard the tool may be raised after forming the core C without cutting the groove G. During the upward movement of the tool over the hard core C the core gripping dogs 36 and 36ª and the dogs A and B merely ride up on the core without biting into it. When the dogs A and B approach the upper end of the core the springs 44 urge them downwardly and inwardly so that their ends ride upwardly and inwardly on the end of the core. The dogs A and B are thus positioned under the lower end of the fish F and come into supporting cooperation with the fish. Because of the number and spacing of the dogs A and B they are capable of recovering fish or lost objects of practically any size. With the fish F supported by the dogs A and B the tool may be brought to the surface of the ground to remove the fish from the well. The fishing tool of the present invention is capable of employment where earth formations of various characters are encountered and is adapted to recover fish of various sizes and shapes.

Having described only a typical form and application of our invention, we do not wish to be limited or restricted to the specific form and application herein set forth, but wish to reserve to ourselves any modifications or variations that may appear to those skilled in the art or fall within the scope of the following claims.

Having described our invention, we claim:

1. A fishing tool including a tubular body, means on the lower end of the body for making an annular cut to form a core for reception by the body, and means for lifting a fish from the top of the core when the tool is raised, the last mentioned means comprising pivoted dogs of different lengths in the body operable to move under the fish on the core.

2. A well tool including a tubular body, means on the lower end of the body for making an annular cut to form a core for reception by the body, a cutter in the body pivoted about a substantially vertical axis to cut a groove in the core when the tool is rotated, and dogs on the body to engage in the groove and recover the core after the making of said groove.

3. A fishing tool including a tubular body, means on the lower end of the body for making an annular cut and forming a core for reception by the body, pivoted dogs on the body for retaining a core of medium hardness in the body and thus retaining a fish carried by the core, and pivoted dogs on the body for lifting a fish from the upper end of a hard core and for retaining the fish after its removal from the core.

4. A fishing tool including a tubular body, means on the lower end of the body for making an annular cut and forming a core for reception by the body, pivoted dogs on the body for retaining a core of medium hardness in the body and thus retaining a fish carried by the core, and means on the body for recovering a fish from the upper end of a hard core, the last mentioned means including a pivoted member for engaging under the fish.

5. A fishing tool including a tubular body, means on the lower end of the body for making an annular cut and forming a core for reception by the body, means on the body for retaining a core of medium hardness in the body and thus retaining a fish carried by the core, and means on the body for recovering a fish from the upper end of a hard core, the last mentioned means including pivoted dogs projectable inwardly to points adjacent the central vertical axis of the body, and shorter pivoted dogs projectable into the spaces between the first named dogs.

6. A fishing tool including a tubular body, means on the lower end of the body for making an annular cut to form a core for reception by the body, and means for lifting a fish from the top of the core when the tool is raised, the last mentioned means including spaced pivoted dogs carried by the body and projectable inwardly to points adjacent the central vertical axis of the body, and pivoted dogs of less length than the first named dogs carried by the body to project inwardly in the spaces between the first named dogs.

7. A fishing tool including a tubular body, means on the lower end of the body for making an annular cut to form a core for reception by the body, and means for lifting a fish from the top of the core when the tool is raised, the last mentioned means including a member rotatably supported in the body, relatively long spaced dogs pivoted on the member to project inwardly to points adjacent the vertical axis of the tool, shorter dogs pivoted on the member to project inwardly in the spaces between the first mentioned dogs, and means urging the dogs inwardly.

8. A fishing tool including a tubular body, means on the lower end of the body for making an annular cut and forming a core for reception by the body, means on the body for retaining a core of medium hardness in the body and thus retaining a fish carried by the core including a plurality of pivoted core gripping dogs, and means below the last mentioned means for recovering a fish from the upper end of a hard core, the last mentioned means including pivoted fish engaging members adapted to move inwardly at the upper end of the core, the said members being of a greater length than the dogs.

9. A well tool including a tubular body, means on the lower end of the body for making an annular cut to provide a core for reception by the body, means on the body for making a groove around the core, and a core catcher below the last named means including dogs for biting into the core at the groove.

10. A well tool including a tubular body, means on the lower end of the body for making an annular cut to provide a core for reception by the body, a cutter in the body above said means for making a groove in the core, and means in the body below the cutter for engaging in the groove to recover the core.

11. In a fishing tool, a tubular shoe, and cutting blades projecting downwardly from the shoe to make an annular cut and being inclined with respect to the longitudinal axis of the tool to feed a fish into the shoe as the tool is rotated to make the cut, said blades having upwardly and inwardly inclined fish engaging inner edges.

12. A fishing tool including a tubular body, means on the lower end of the body for making an annular cut and forming a core for reception by the body, a member rotatably supported in the body, pivoted dogs on the member operatable to lift a fish from the upper end of a hard core, a second member rotatably supported in the body on the first named member, and pivoted dogs on the second member for retaining medium hard cores.

JESSE C. WRIGHT.
JOHN H. HOWARD.